(12) United States Patent
Lee

(10) Patent No.: US 11,452,091 B2
(45) Date of Patent: Sep. 20, 2022

(54) DEVICE AND METHOD OF HANDLING HYBRID AUTOMATIC REPEAT REQUEST TRANSMISSION

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 278 days.

(21) Appl. No.: 15/414,647

(22) Filed: Jan. 25, 2017

(65) Prior Publication Data

US 2017/0230971 A1 Aug. 10, 2017

Related U.S. Application Data

(60) Provisional application No. 62/290,962, filed on Feb. 4, 2016.

(51) Int. Cl.
*H04W 72/04* (2009.01)
*H04L 1/18* (2006.01)
*H04L 5/00* (2006.01)

(52) U.S. Cl.
CPC ....... *H04W 72/0446* (2013.01); *H04L 1/1812* (2013.01); *H04L 1/1854* (2013.01); *H04L 1/1861* (2013.01); *H04L 5/0055* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 2008/0080422 A1* | 4/2008 | Frederiksen | ......... | H04L 5/0091 370/329 |
| 2011/0116457 A1* | 5/2011 | Damnjanovic | ....... | H04L 5/0042 370/329 |
| 2012/0120854 A1* | 5/2012 | Zhang | .................. | H04B 7/2656 370/280 |
| 2013/0039295 A1* | 2/2013 | Chou | .................. | H04W 72/042 370/329 |
| 2013/0242815 A1* | 9/2013 | Wang | .................... | H04L 1/1854 370/280 |

(Continued)

FOREIGN PATENT DOCUMENTS

CN 104518857 A 4/2015
CN 105101446 A 11/2015

(Continued)

*Primary Examiner* — Gregory B Sefcheck
*Assistant Examiner* — Suk Jin Kang
(74) *Attorney, Agent, or Firm* — Winston Hsu

(57) ABSTRACT

A communication device for handling a hybrid automatic repeat request (HARQ) transmission comprises a storage unit for storing instructions and a processing circuit coupled to the storage unit. The processing circuit is configured to execute the instructions stored in the storage unit. The instructions comprise performing a first downlink (DL) reception in a first subframe from a serving cell; and transmitting a first HARQ feedback in response to the first DL reception in a second subframe to the serving cell, wherein the second subframe is determined according to the first subframe and a sum of a predetermined timing and a first HARQ timing.

9 Claims, 10 Drawing Sheets

(56) References Cited

U.S. PATENT DOCUMENTS

| | | | |
|---|---|---|---|
| 2013/0308464 A1* | 11/2013 | Park | H04W 72/0406 370/241 |
| 2013/0336267 A1* | 12/2013 | Li | H04L 1/1854 370/329 |
| 2014/0362756 A1* | 12/2014 | Maeda | H04W 48/12 370/312 |
| 2014/0362798 A1* | 12/2014 | Shu | H04L 1/1854 370/329 |
| 2015/0016351 A1* | 1/2015 | Lee | H04L 1/1671 370/329 |
| 2015/0036559 A1* | 2/2015 | Zhang | H04L 1/1864 370/280 |
| 2015/0043480 A1* | 2/2015 | Lee | H04L 5/0055 370/329 |
| 2015/0049709 A1* | 2/2015 | Damnjanovic | H04L 5/0055 370/329 |
| 2015/0280876 A1* | 10/2015 | You | H04L 5/0048 370/329 |
| 2015/0349936 A1* | 12/2015 | Seo | H04L 5/14 370/277 |
| 2015/0365931 A1* | 12/2015 | Ng | H04L 1/1812 370/329 |
| 2016/0037494 A1* | 2/2016 | Meng | H04L 5/0055 370/281 |
| 2016/0043820 A1* | 2/2016 | Damnjanovic | H04L 1/0028 370/329 |
| 2016/0142898 A1* | 5/2016 | Poitau | H04W 76/14 370/329 |
| 2016/0164622 A1* | 6/2016 | Yl | H04B 7/2656 370/280 |
| 2016/0226631 A1* | 8/2016 | Seo | H04L 1/1854 |
| 2016/0338026 A1* | 11/2016 | Yang | H04L 1/1812 |
| 2016/0353443 A1* | 12/2016 | Desai | H04L 5/0092 |
| 2016/0381680 A1* | 12/2016 | Yasukawa | H04W 72/1289 370/280 |
| 2016/0381689 A1* | 12/2016 | Seo | H04L 5/001 370/280 |
| 2017/0019218 A1* | 1/2017 | Sadeghi | H04L 5/001 |
| 2017/0034785 A1* | 2/2017 | Suzuki | H04W 52/08 |
| 2017/0055296 A1* | 2/2017 | Cheng | H04W 74/0841 |
| 2017/0078079 A1* | 3/2017 | Papasakellariou | H04W 72/04 |
| 2017/0135084 A1* | 5/2017 | Kuchibhotla | H04W 24/08 |
| 2017/0135096 A1* | 5/2017 | Kuchibhotla | H04L 5/0055 |
| 2017/0135116 A1* | 5/2017 | Kuchibhotla | H04L 5/0055 |
| 2017/0215202 A1* | 7/2017 | Yang | H04W 72/1278 |
| 2017/0223550 A1* | 8/2017 | Takeda | H04L 5/001 |
| 2017/0223671 A1* | 8/2017 | He | H04L 5/0096 |
| 2017/0223687 A1* | 8/2017 | Kuchibhotla | H04L 5/0094 |
| 2017/0231029 A1* | 8/2017 | Pelletier | H04W 72/1221 |
| 2017/0265207 A1* | 9/2017 | Takeda | H04W 28/04 |
| 2017/0280448 A1* | 9/2017 | Takeda | H04W 16/14 |
| 2017/0280467 A1* | 9/2017 | Zhu | H04W 72/0426 |
| 2017/0290008 A1* | 10/2017 | Tooher | H04L 1/1893 |
| 2017/0310452 A1* | 10/2017 | Lee | H04L 5/14 |
| 2017/0331611 A1* | 11/2017 | Stern-Berkowitz | H04W 72/1289 |
| 2017/0359810 A1* | 12/2017 | Kuchibhotla | H04L 5/0053 |
| 2017/0366313 A1* | 12/2017 | Rahman | H04W 72/085 |
| 2017/0367092 A1* | 12/2017 | Kim | H04W 72/0446 |
| 2017/0367106 A1* | 12/2017 | Kim | H04W 72/1215 |
| 2018/0006790 A1* | 1/2018 | Park | H04L 5/0055 |
| 2018/0049221 A1* | 2/2018 | Park | H04W 72/1247 |
| 2018/0077698 A1* | 3/2018 | Takeda | H04L 1/1854 |
| 2018/0109360 A1* | 4/2018 | Sun | H04L 1/1854 |
| 2018/0206288 A1* | 7/2018 | Pelletier | H04W 72/1221 |
| 2018/0255578 A1* | 9/2018 | Kim | H04W 72/02 |
| 2018/0270041 A1* | 9/2018 | Lee | H04B 7/155 |
| 2018/0278373 A1* | 9/2018 | Wang | H04L 1/1812 |
| 2018/0302196 A1* | 10/2018 | Sadeghi | H04L 5/001 |
| 2018/0302885 A1* | 10/2018 | Behravan | H04W 36/0088 |
| 2018/0368122 A1* | 12/2018 | Kuchibhotla | H04L 5/0007 |
| 2019/0182808 A1* | 6/2019 | Xia | H04W 72/042 |
| 2019/0288799 A1* | 9/2019 | Lei | H04L 1/1657 |
| 2019/0297650 A1* | 9/2019 | Cheng | H04W 74/004 |
| 2020/0045698 A1* | 2/2020 | Kim | H04L 5/0091 |

FOREIGN PATENT DOCUMENTS

| | | |
|---|---|---|
| CN | 105409135 A | 3/2016 |
| CN | 105594149 A | 5/2016 |
| EP | 3 054 616 A1 | 8/2016 |
| WO | 2014153688 A1 | 10/2014 |
| WO | 2015012655 A1 | 1/2015 |
| WO | 2015050419 A1 | 4/2015 |
| WO | 2015/134907 A1 | 9/2015 |

* cited by examiner

DEVICE AND METHOD OF HANDLING HYBRID AUTOMATIC REPEAT REQUEST TRANSMISSION

CROSS REFERENCE TO RELATED APPLICATIONS

This application claims the benefit of U.S. Provisional Application No. 62/290,962 filed on Feb. 4, 2016, which is incorporated herein by reference.

BACKGROUND OF THE INVENTION

1. Field of the Invention

The present invention relates to a communication device and a method used in a wireless communication system, and more particularly, to a communication device and a method of handling a hybrid automatic repeat request (HARQ) transmission in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to a serving cell (e.g., licensed serving cell and/or unlicensed serving cell), to ease load of the network traffic. For example, the eNB may provide services to the UE via both a licensed serving cell and an unlicensed serving cell. However, even if the UE can receive a packet from the eNB at a first time instant, the UE may not be able to acknowledge the reception of the packet at a second time instant due to uncertainty of available resource of the unlicensed serving cell of the eNB. That is, there may not be available resource for transmitting a hybrid automatic repeat request (HARQ) for responding to the reception of the packet. Accordingly, the eNB does not know whether the packet is received correctly by the UE, and the communication between the UE and the eNB cannot proceed regularly. Benefit of introduction of the unlicensed serving cell is reduced. Thus, how to handle a HARQ feedback when the unlicensed serving cell is used an important problem to be solved.

SUMMARY OF THE INVENTION

The present invention therefore provides a method and related communication device for handling a hybrid automatic repeat request (HARQ) transmission to solve the abovementioned problem.

A communication device for handling a hybrid automatic repeat request (HARQ) transmission comprises a storage unit for storing instructions and a processing circuit coupled to the storage unit. The processing circuit is configured to execute the instructions stored in the storage unit. The instructions comprise performing a first downlink (DL) reception in a first subframe from a serving cell; and transmitting a first HARQ feedback in response to the first DL reception in a second subframe to the serving cell, wherein the second subframe is determined according to the first subframe and a sum of a predetermined timing and a first HARQ timing.

A communication device for handling a hybrid automatic repeat request (HARQ) transmission comprises a storage unit for storing instructions and a processing circuit coupled to the storage unit. The processing circuit is configured to execute the instructions stored in the storage unit. The instructions comprise performing a first downlink (DL) reception in a first subframe from a serving cell; determining whether a second subframe scheduled for a first HARQ feedback in response to the first DL reception is clear according to a result of a listen before talk (LBT); transmitting the first HARQ feedback in the second subframe to the serving cell, when the second subframe is clear according to the result of the LBT; and stopping transmitting the first HARQ feedback in the second subframe to the serving cell, when the second subframe is not clear according to the result of the LBT.

A communication device for handling a hybrid automatic repeat request (HARQ) transmission comprises a storage unit for storing instructions and a processing circuit coupled to the storage unit. The processing circuit is configured to execute the instructions stored in the storage unit. The instructions comprise performing at least one first downlink (DL) reception in a first subframe of a frame from a serving cell; transmitting a first HARQ feedback in response to the at least one first DL reception in a second subframe to the serving cell, wherein the second subframe is determined according to the first subframe, a reference uplink (UL)/DL configuration and a timing offset between a corresponding subframe of the reference UL/DL configuration and the first subframe.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
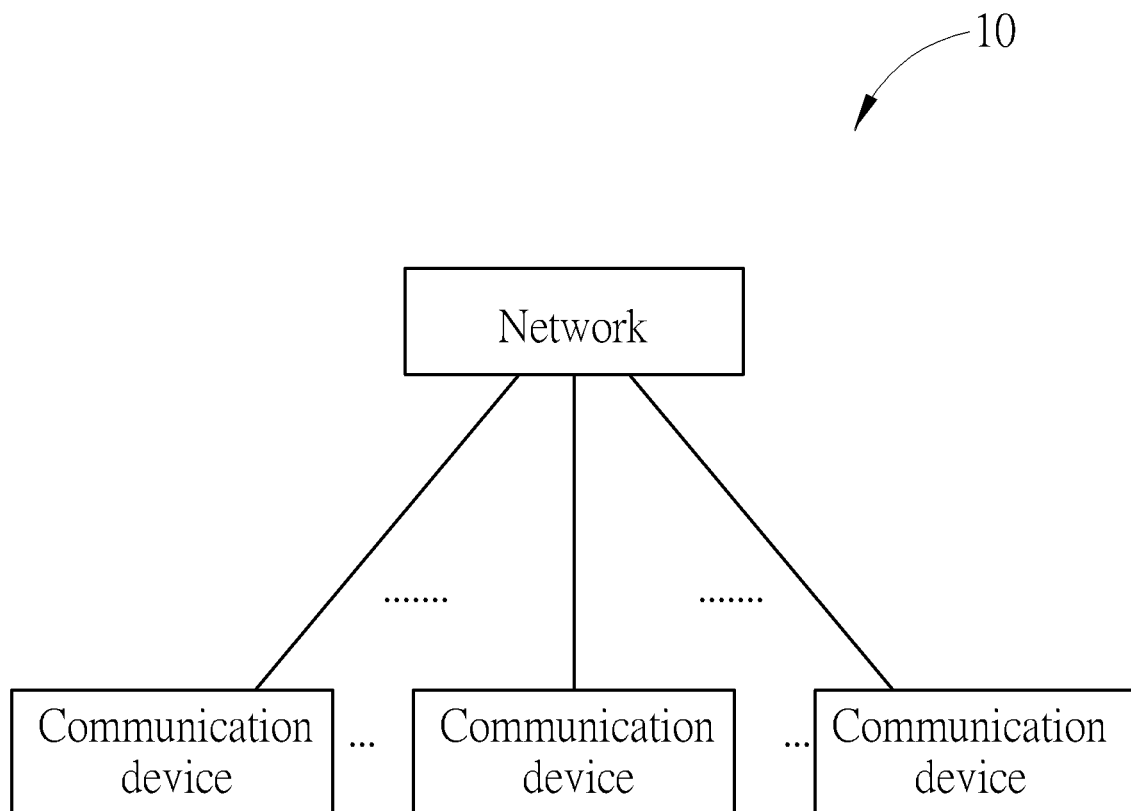
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
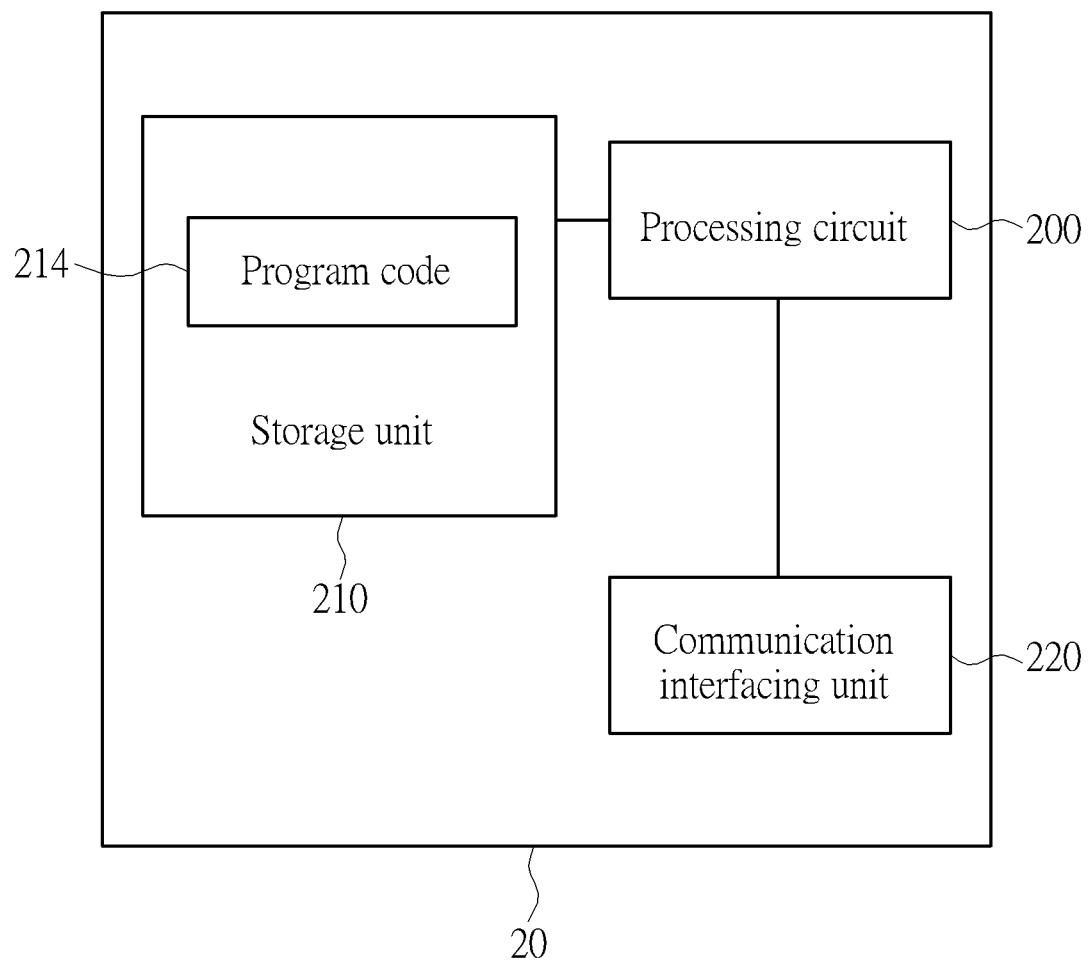
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

Figure 3:
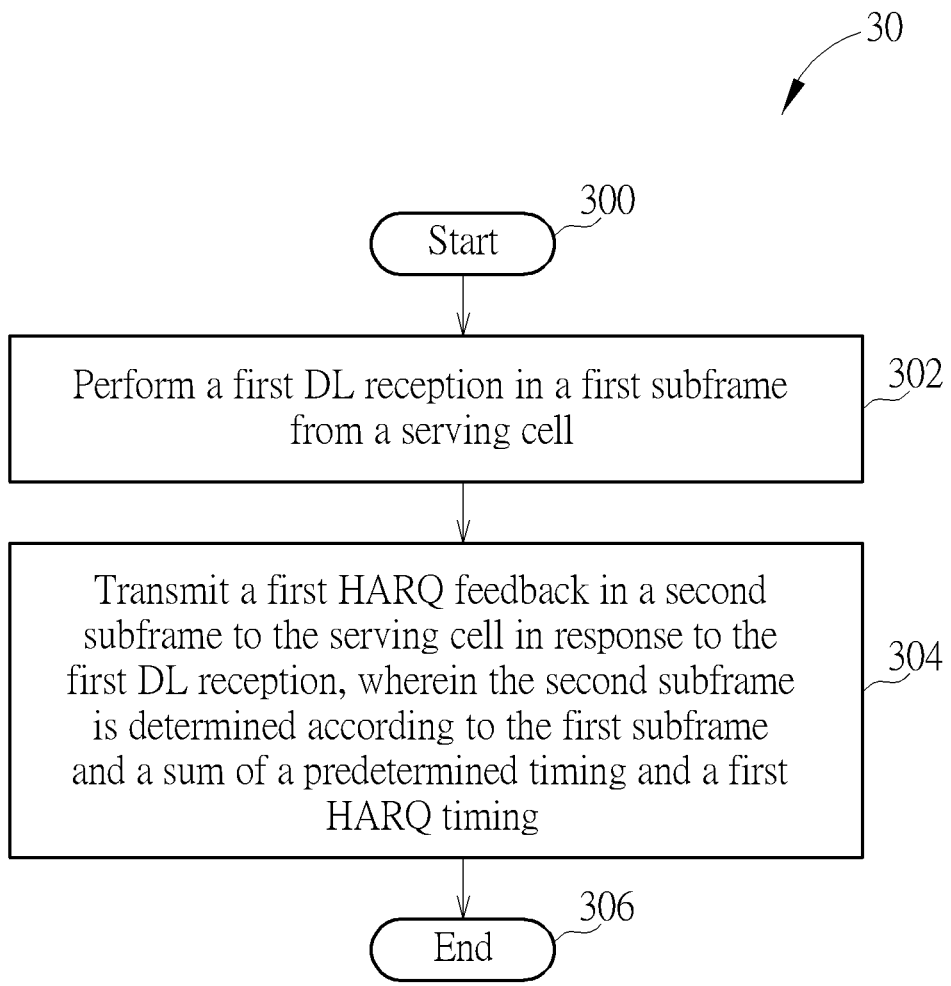
FIG. 3 is a flowchart of a process according to an example of the present invention.

FIG. 3 is a flowchart of a process 30 according to an example of the present invention. The process 30 may be utilized in a communication device shown in FIG. 1, to handle a hybrid automatic repeat request (HARQ) transmission for a serving cell. The process 30 may be compiled into the program code 214 and includes the following steps:

Step 300: Start.

Step 302: Perform a first DL reception in a first subframe from a serving cell.

Step 304: Transmit a first HARQ feedback in a second subframe to the serving cell in response to the first DL reception, wherein the second subframe is determined according to the first subframe and a sum of a predetermined timing and a first HARQ timing.

Step 306: End.

According to the process 30, the communication device may perform a first DL reception in a first subframe from a serving cell (e.g., of the network). Then, the communication device may transmit a first HARQ feedback in a second subframe to the serving cell in response to the first DL reception, wherein the second subframe is determined according to the first subframe and a sum of a predetermined timing (e.g., 4, 5, 7, 9, 11, 13, 15 or 17 subframes) and a first HARQ timing (e.g., 0, 2, 4, 6 or 8 subframes). That is, when a HARQ feedback should be transmitted is determined according to both a predetermined timing (e.g., 4, 5, 7, 9, 11, 13, 15 or 17 subframes) and a HARQ timing which is dynamically or semi-statistically configured. Thus, uncertainty of available resource of the serving cell is solved according to the process 30.

Realization of the process 30 is not limited to the above description. The following examples may be applied for realizing the process 30.

In one example, the predetermined timing may be a fixed value stored in the communication device, or may be configured by the serving cell. In one example, the first HARQ timing may be determined according to a DL control information (DCI) (e.g., transmitted by the serving cell) for (e.g., assigning or granting) the first DL reception, or may be determined according to a common DCI (e.g., transmitted by the serving cell). According to the above examples, the sum of the predetermined timing and the first HARQ timing may be determined according to the DCI (e.g., transmitted by the serving cell) for (e.g., assigning or granting) the first DL reception. In one example, the first HARQ timing may indicate whether the first HARQ feedback is postponed and/or a time period postponed with respect to the predetermined timing.

In one example, the communication device may perform a second DL reception in a third subframe from the serving cell. Then, the communication device may transmit a second HARQ feedback in a fourth subframe to the serving cell in response to the second DL reception, wherein the fourth subframe is determined according to the third subframe, and a sum of the predetermined timing and a second HARQ timing. In this situation, the following examples may be applied to the case where the second subframe and the fourth subframe are the same subframe. In one example, the communication device may transmit the first HARQ feedback and the second HARQ feedback according to a time-domain bundling. In one example, the communication device may transmit the first HARQ feedback and the second HARQ feedback according to the sum of the predetermined timing and the first HARQ timing and the sum of the predetermined timing and the second HARQ timing. In one example, the communication device may transmit the first HARQ feedback and the second HARQ feedback according to a first DCI for (e.g., assigning or granting) the first DL reception and a second DCI (e.g., assigning or granting) for the second DL reception. In one example, the first HARQ feedback may be transmitted via a dedicated resource (e.g., dedicated frequency resource), and the dedicated resource may be determined according to a higher layer configuration, a shift for the second subframe and/or the number of control channel element (CCE) indices of a DCI corresponding to the first DL reception.

Figure 4:
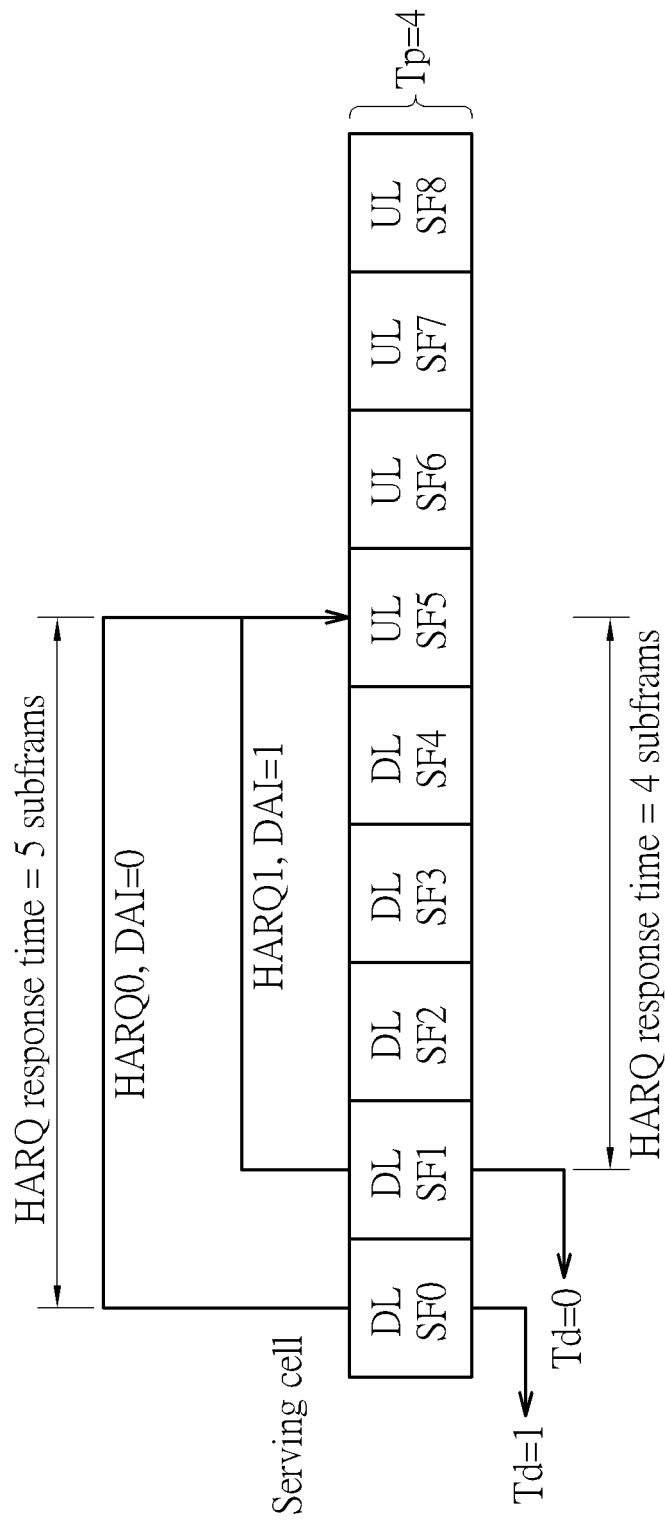
FIG. 4 is a schematic diagram of timing of HARQ feedbacks according to an example of the present invention.

FIG. 4 is a schematic diagram of timing of HARQ feedbacks according to an example of the present invention. There are 9 subframes SF0-SF8, wherein the subframes SF0-SF4 are DL subframes and the subframes SF5-SF8 are UL subframes. In the present example, one or two DL receptions may be performed in the subframes SF0-SF1 from a serving cell, and HARQ feedback HARQ0-HARQ1 may be transmitted correspondingly to the serving cell in response to the DL reception(s). It is assumed that a predetermined timing Tp is 4 subframes and HARQ timings Td for the subframes SF0-SF1 are 1 and 0 subframe, respectively. If a communication device performs a first DL reception in the subframe SF0, the communication device transmits the HARQ feedback HARQ0 in the subframe SF5 according to the predetermined timing Tp and the HARQ timing Td of the subframe SF0. That is, a HARQ response time for the first DL reception is 5 subframes (i.e., Tp+Td=5).

If the communication device further performs a second DL reception in the subframe SF1, the communication device also transmits the HARQ feedback HARQ1 in the subframe SF5 according to the predetermined timing Tp and the HARQ timing Td of the subframe SF1. That is, a HARQ response time for the second DL reception is 4 subframes (i.e., Tp+Td=4). The HARQ feedbacks HARQ0-HARQ1 may be transmitted jointly in the subframe SF5 according to the previous description. In one example, the HARQ feedbacks HARQ0-HARQ1 may be transmitted according to a time-domain bundling. In detail, a logical "AND" may be used for bundling the HARQ feedbacks HARQ0-HARQ1, and the bundled result [HARQ0 AND HARQ1] is transmitted in the subframe SF5. In one example, the HARQ feedbacks HARQ0-HARQ1 may be transmitted according to the HARQ timings Td of the subframes SF0-SF1. In detail, [HARQ1, HARQ0] are transmitted in the subframe SF5, because the HARQ timings Td are 0 and 1, respectively. In one example, the HARQ feedbacks HARQ0-HARQ1 may be transmitted according to DL assignment indices (DAIs) in DCIs for the first DL reception and the second DL reception. In detail, [HARQ0, HARQ1] are transmitted in the subframe SF5, because the DAIs are 0 and 1, respectively.

Figure 5:
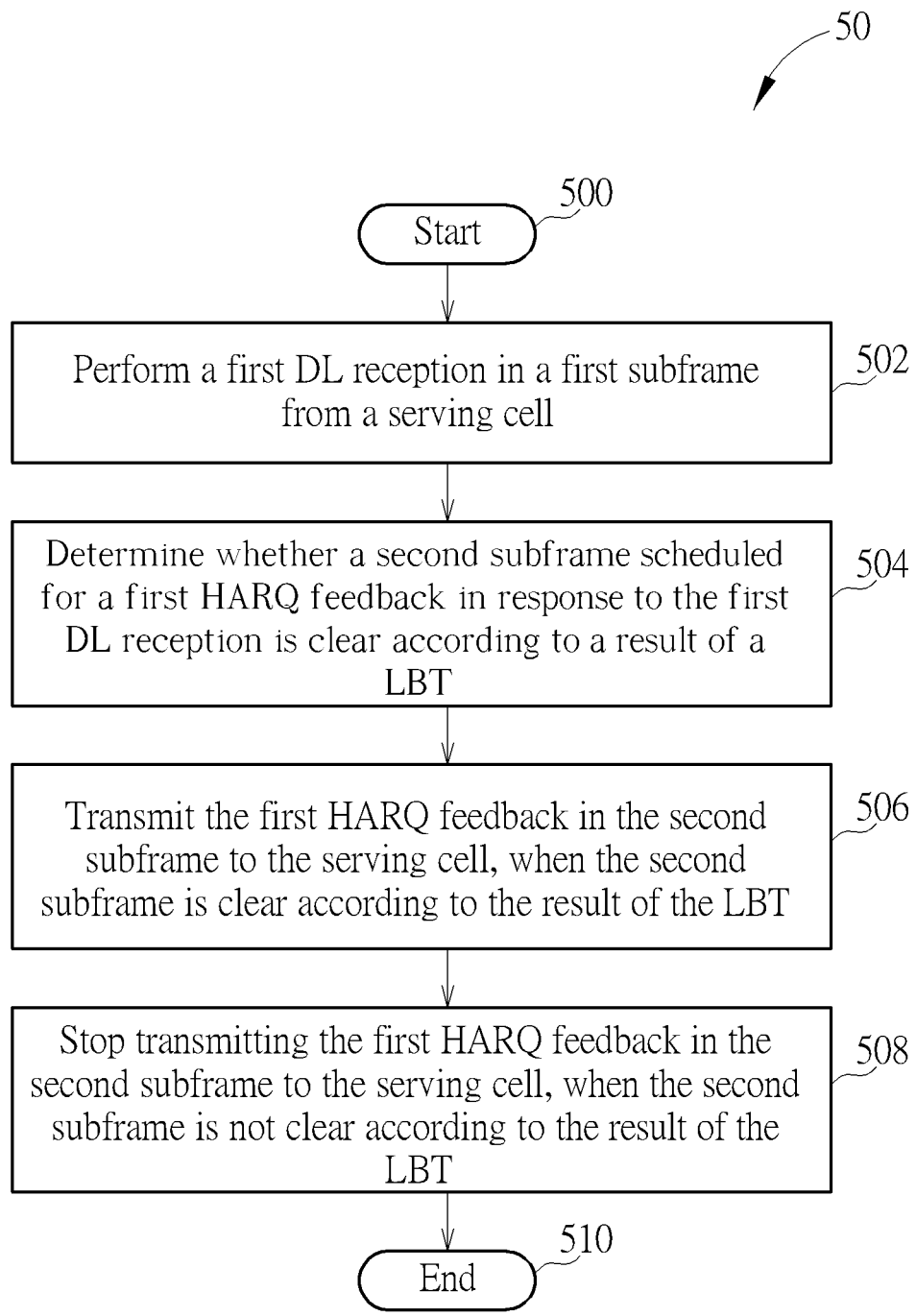
FIG. 5 is a flowchart of a process according to an example of the present invention.

FIG. 5 is a flowchart of a process 50 according to an example of the present invention. The process 50 may be utilized in a communication device shown in FIG. 1, to handle a HARQ feedback for a serving cell. The process 50 may be compiled into the program code 214 and includes the following steps:

Step 500: Start.

Step 502: Perform a first DL reception in a first subframe from a serving cell.

Step 504: Determine whether a second subframe scheduled for a first HARQ feedback in response to the first DL reception is clear according to a result of a listen before talk (LBT).

Step 506: Transmit the first HARQ feedback in the second subframe to the serving cell, when the second subframe is clear according to the result of the LBT.

Step 508: Stop transmitting the first HARQ feedback in the second subframe to the serving cell, when the second subframe is not clear according to the result of the LBT.

Step 510: End.

According to the process 50, the communication device may perform a first DL reception in a first subframe from a serving cell (e.g., of the network). The communication device may determine whether a second subframe scheduled for a first HARQ feedback in response to the first DL reception is clear according to a result of a LBT. Then, the communication device may transmit the first HARQ feedback in the second subframe to the serving cell, when the second subframe is clear according to the result of the LBT. The communication device may stop transmitting the first HARQ feedback in the second subframe to the serving cell, when the second subframe is not clear according to the result of the LBT. That is, even if a subframe is scheduled (or is determined) for performing a HARQ feedback corresponding to a DL reception, a LBT is performed to check whether the subframe is clear. Whether the HARQ feedback should be performed in the subframe is determined according to a result of the LBT, to improve the reliability of the transmission. Thus, uncertainty of available resource of the serving cell is solved according to the process 50.

Realization of the process 50 is not limited to the above description. The following examples may be applied for realizing the process 50.

In one example, the communication device may perform a second DL reception in a third subframe from the serving cell. Then, the communication device may transmit the first HARQ feedback and a second HARQ feedback in response to the second DL reception to the serving cell in a dedicated resource (e.g., dedicated frequency resource) of a fourth subframe, when the second subframe is not clear according to the result of the LBT. The dedicated resource may be determined according to various ways. For example, the dedicated resource may be determined according to a higher layer configuration, a shift for the second subframe and/or the number of first CCE indices of a DCI corresponding to the second DL reception. In one example, the communication device may transmit the first HARQ feedback and the second HARQ feedback according to a time-domain bundling.

In another example, the communication device may transmit the first HARQ feedback in a dedicated resource (e.g., dedicated frequency resource) of a third subframe to the serving cell, when the second subframe is not clear according to the result of the LBT. For example, the third subframe may be scheduled (or reserved) for a second HARQ feedback. That is, a second DL reception corresponding to the second HARQ feedback is not performed, but the third subframe scheduled (or reserved) for the second HARQ feedback can still be used for transmitting the first HARQ feedback. In one example, the first HARQ feedback may be transmitted via a dedicated resource, and the dedicated resource may be determined according to a higher layer configuration, a shift for the second subframe and/or the number of first CCE indices of a DCI corresponding to the first DL reception.

Figure 6:
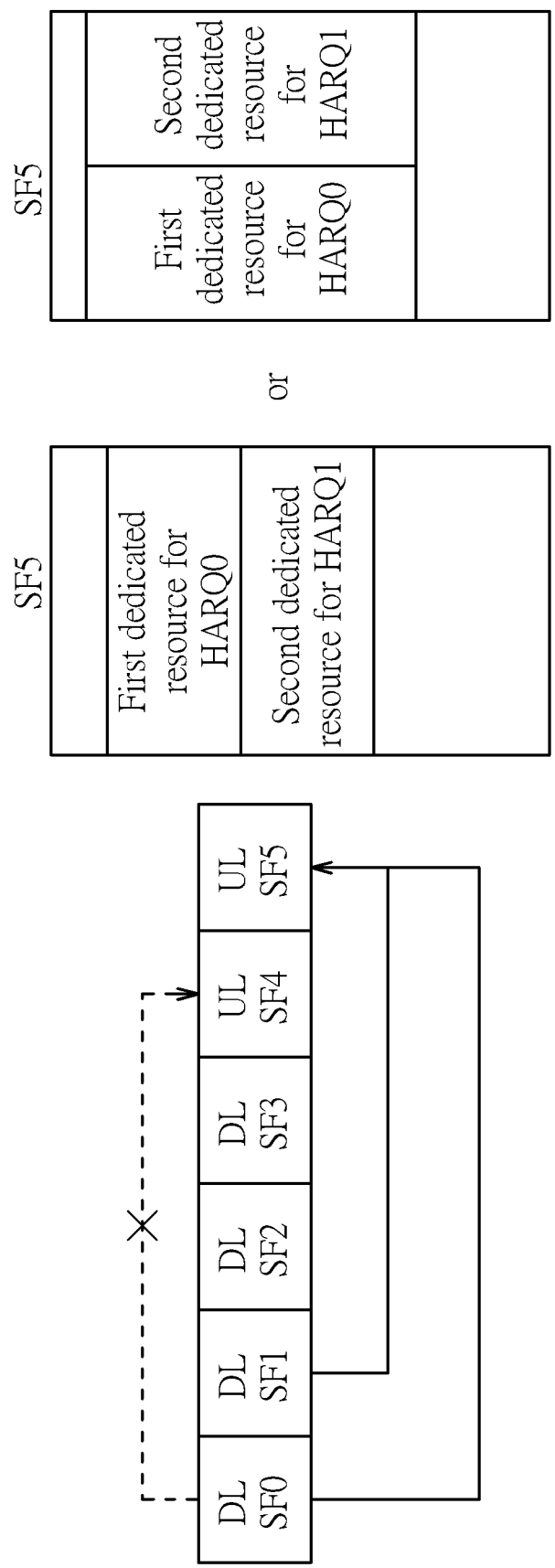
FIG. 6 is a schematic diagram of timing of HARQ feedbacks according to an example of the present invention.

FIG. 6 is a schematic diagram of timing of HARQ feedbacks according to an example of the present invention. There are 6 subframes SF0-SF5, wherein the subframes SF0-SF3 are DL subframes and the subframes SF4-SF5 are UL subframes. In the present example, one or two DL receptions may be performed in the subframes SF0-SF1 from a serving cell, and HARQ feedback HARQ0-HARQ1 may be transmitted correspondingly to the serving cell in response to the DL reception(s). For example, a HARQ feedback is scheduled be transmitted in a subframe (n+4) in response to a DL reception performed in a subframe n. If a communication device performs a first DL reception in the subframe SF0, the communication device performs a LBT to check whether the subframe SF4 is clear. It is assumed that the subframe SF4 is not clear according to a result of the LBT. Accordingly, the communication device does not transmit the HARQ feedback HARQ0 in the subframe SF4.

If the communication device further performs a second DL reception in the subframe SF1, the communication device also performs a LBT to check whether the subframe SF5 is clear. It is assumed that the subframe SF5 is clear according to a result of the LBT. Accordingly, the communication device transmits the HARQ feedback HARQ0 and the HARQ feedback HARQ1 in a dedicated resource of the subframe SF5. That is, the first HARQ feedback which is delayed is transmitted jointly with the second HARQ feedback in the subframe SF5 which is scheduled for the second HARQ feedback.

In another example, the communication device does not perform a second DL reception in the subframe SF1. The communication device still performs a LBT to check whether the subframe SF5 is clear. It is assumed that the subframe SF5 is clear according to a result of the LBT. Accordingly, the communication device transmits the HARQ feedback HARQ0 in a dedicated resource of the subframe SF5. That is, the first HARQ feedback which is delayed is transmitted in the subframe SF5. For example, the subframe SF5 may be scheduled (or reserved) for the second HARQ feedback.

Figure 7:
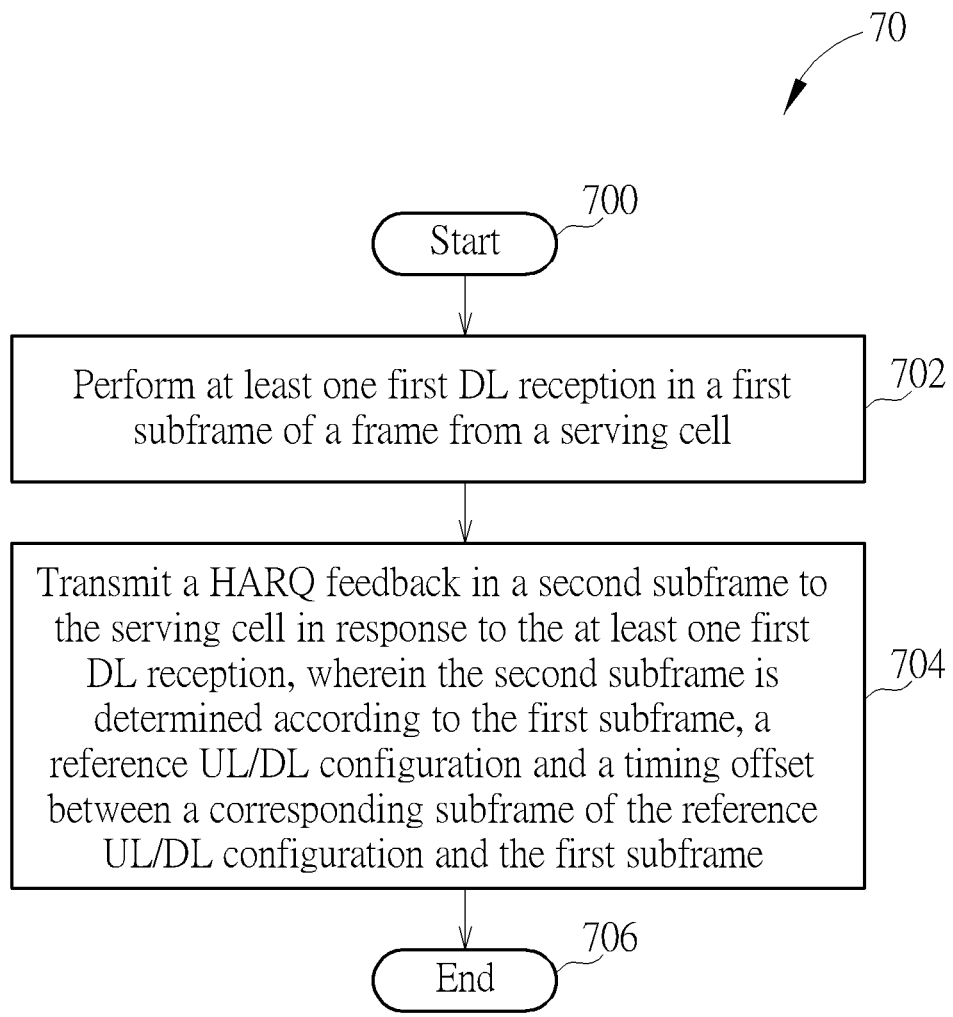
FIG. 7 is a flowchart of a process according to an example of the present invention.

FIG. 7 is a flowchart of a process 70 according to an example of the present invention. The process 70 may be utilized in a communication device shown in FIG. 1, to handle a HARQ transmission for a serving cell. The process 70 may be compiled into the program code 214 and includes the following steps:

Step 700: Start.

Step 702: Perform at least one first DL reception in a first subframe of a frame from a serving cell.

Step 704: Transmit a HARQ feedback in a second subframe to the serving cell in response to the at least one first DL reception, wherein the second subframe is determined according to the first subframe, a reference UL/DL configuration and a timing offset between a corresponding subframe of the reference UL/DL configuration and the first subframe.

Step 706: End.

According to the process 70, the communication device may perform at least one first DL reception in a first subframe of a frame from a serving cell (e.g., of the network). Then, the communication device may transmit a HARQ feedback in a second subframe to the serving cell in response to the at least one DL reception, wherein the second subframe is determined according to the first subframe, a reference UL/DL configuration and a timing offset between a corresponding subframe of the reference UL/DL configuration and the first subframe. That is, the frame for performing the DL reception(s) and the reference UL/DL configuration for performing the HARQ feedback may not be aligned in the time domain. Thus, uncertainty of available resource of the serving cell can be mitigated by properly configuring the reference UL/DL configuration and the timing offset.

Realization of the process 70 is not limited to the above description. The following examples may be applied for realizing the process 70.

In one example, the communication device may transmit a second HARQ feedback in a third subframe to the serving cell in response to the at least one first DL reception, wherein the third subframe is determined according to a fourth subframe for at least one second DL reception, the reference UL/DL configuration and the timing offset. That is, the third subframe which is originally scheduled for transmitting another HARQ feedback in response to the at least one second DL reception is also used for transmitting the second HARQ feedback. In other words, the at least one first DL reception in the first subframe can be acknowledged in multiple subframes. Thus, more opportunities are provided for acknowledging the at least one first DL reception.

In one example, the communication device may determine whether the second subframe is clear according to a result of a LBT. The communication device may transmit the first HARQ feedback in the second subframe to the serving cell, when the second subframe is clear according to the result of the LBT. The communication device may stop transmitting the first HARQ feedback in the second subframe to the serving cell, when the second subframe is not clear according to the result of the LBT. That is, even if a subframe is scheduled (or is determined) for performing a HARQ feedback corresponding to a DL reception, a LBT is performed to check whether the subframe is clear. Whether the HARQ feedback should be performed in the subframe is determined according to a result of the LBT, to improve the reliability of the transmission. In one example, the timing offset may be received in a DCI (e.g., transmitted by the serving cell). Further, the DCI may be a common DCI or a communication device-specific (e.g., UE-specific) DCI.

Figure 8:
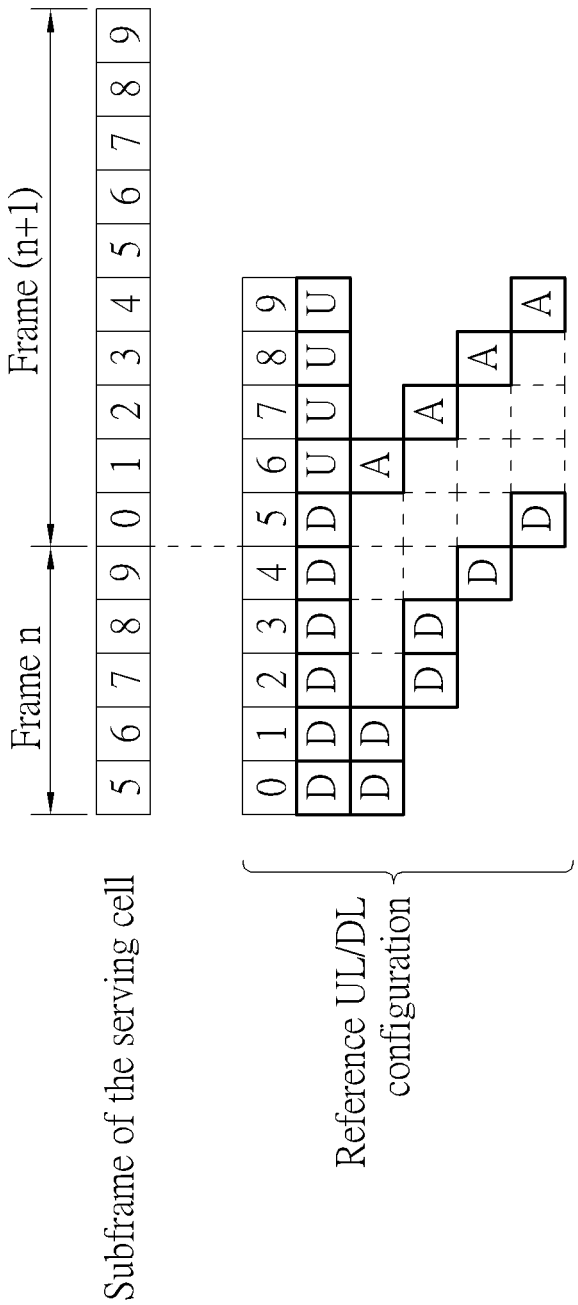
FIG. 8 is a schematic diagram of timing of HARQ feedbacks according to an example of the present invention.

FIG. 8 is a schematic diagram of timing of HARQ feedbacks according to an example of the present invention. There are two frames n and (n+1) for a communication device and a serving cell, wherein the frame n includes subframes 5-9 and the frame (n+1) includes subframes 0-9. In FIG. 8, "D" denotes a DL reception, and "A" denotes a HARQ feedback. As can be seen, a reference UL/DL configuration is not aligned with the frame, i.e., the subframe 0 of the frame is not aligned with the subframe 0 of the reference UL/DL configuration. Taking the subframe 5 of the frame n as an example, a timing offset between a corresponding subframe (i.e., the subframe 0) of the reference UL/DL configuration and the subframe 5 is 5 subframes. According to the reference UL/DL configuration and the timing offset, if one or two DL receptions are performed in the subframes 5-6 of the frame n from the serving cell, a HARQ feedback is transmitted in the subframe 1 of the frame (n+1) to the serving cell in response to the DL reception(s). Similarly, if one or two DL receptions are performed in the subframes 7-8 of the frame n from the serving cell, a HARQ feedback is transmitted in the subframe 2 of the frame (n+1) to the serving cell in response to the DL reception(s). Transmissions of HARQ feedbacks in other subframes can be illustrated according to the above description, and is not narrated herein.

Figure 9:
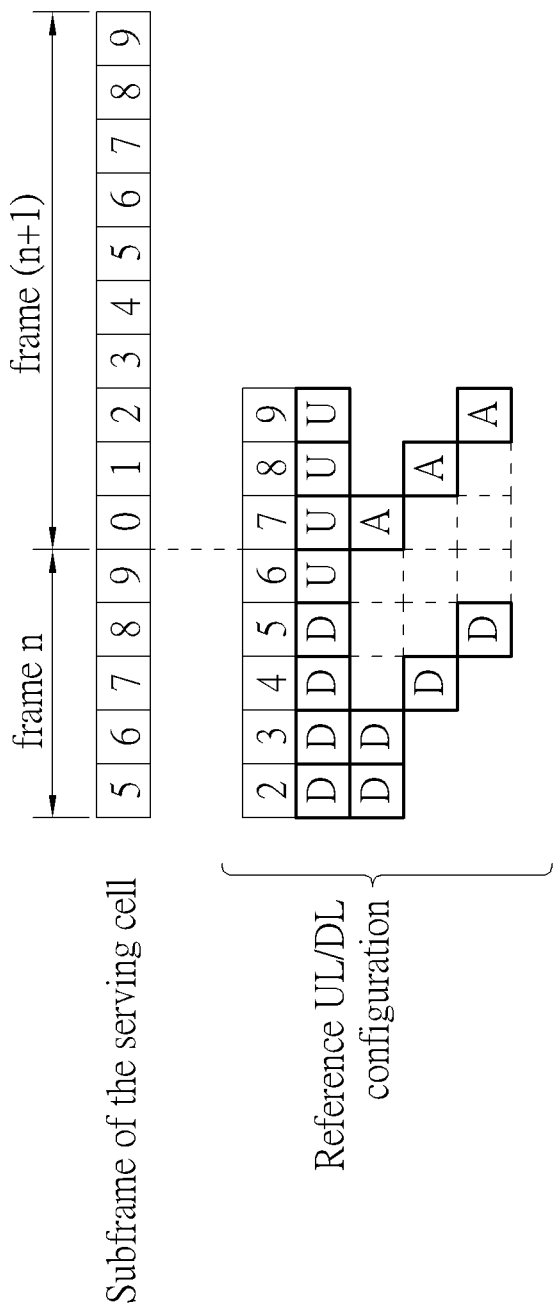
FIG. 9 is a schematic diagram of timing of HARQ feedbacks according to an example of the present invention.

FIG. 9 is a schematic diagram of timing of HARQ feedbacks according to an example of the present invention. There are two frames n and (n+1) for a communication device and a serving cell, wherein the frame n includes subframes 5-9 and the frame (n+1) includes subframes 0-9. In FIG. 9, "D" denotes a DL reception, and "A" denotes a HARQ feedback. As can be seen, a reference UL/DL configuration is not aligned with the frame, i.e., the subframe 0 of the frame is not aligned with the subframe 0 of the reference UL/DL configuration. Taking the subframe 5 of the frame n as an example, a timing offset between a corresponding subframe (i.e., the subframe 2) of the reference UL/DL configuration and the subframe 5 is 3 subframes. According to the reference UL/DL configuration and the timing offset, if one or two DL receptions are performed in the subframes 5-6 of the frame n from the serving cell, a HARQ feedback is transmitted in the subframe 0 of the frame (n+1) to the serving cell in response to the DL reception(s). Similarly, if a DL reception is performed in the subframe 7 of the frame n from the serving cell, a HARQ feedback is transmitted in the subframe 1 of the frame (n+1) to the serving cell in response to the DL reception. Transmissions of HARQ feedbacks in other subframes can be illustrated according to the above description, and is not narrated herein. Comparing with FIG. 8, FIG. 9 is more suitable for the serving cell with a low traffic DL loading, while FIG. 8 is more suitable for the serving cell with a high DL traffic loading.

Figure 10:
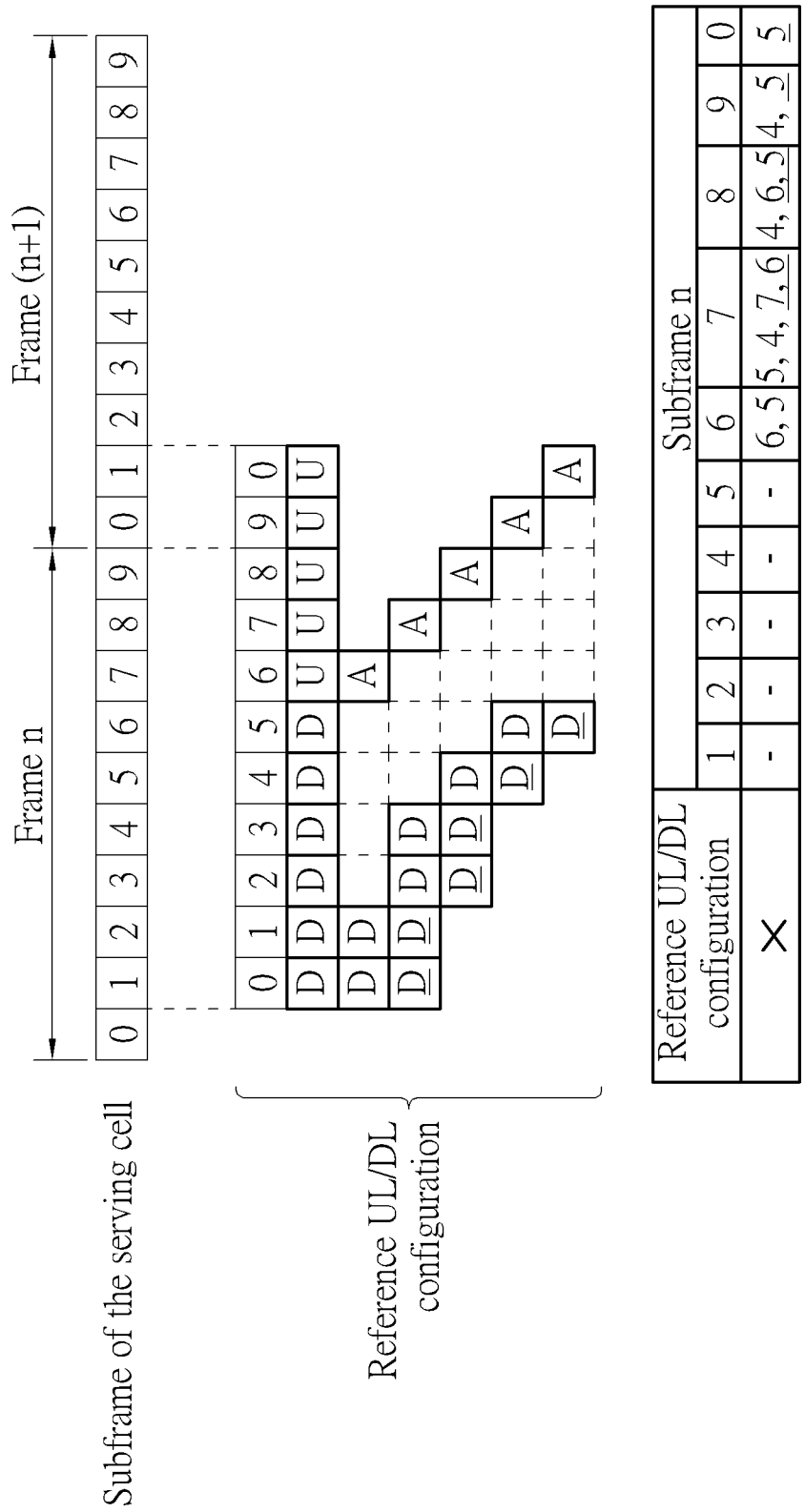
FIG. 10 is a schematic diagram of timing of HARQ feedbacks according to an example of the present invention.

FIG. 10 is a schematic diagram of timing of HARQ feedbacks according to an example of the present invention. There are two frames n and (n+1) for a communication device and a serving cell, wherein each of the frames n and (n+1) includes subframes 0-9. In FIG. 11, "D" without an underline denotes an original DL reception scheduled to be acknowledged. "D" with the underline denotes that a DL reception can also be acknowledged in a later subframe. As can be seen, a reference UL/DL configuration is not aligned with the frame, i.e., the subframe 0 of the frame is not aligned with the subframe 0 of the reference UL/DL configuration. Taking the subframe 1 of the frame n as an example, a timing offset between a corresponding subframe (i.e., the subframe 0) of the reference UL/DL configuration and the subframe 1 is 1 subframe.

According to the reference UL/DL configuration and the timing offset, if one or two DL receptions are performed in the subframes 1-2 of the frame n from the serving cell, a first HARQ feedback is transmitted in the subframe 7 of the frame n to the serving cell in response to the DL reception(s). Further, according to the reference UL/DL configuration and the timing offset, the communication device may also transmit a second HARQ feedback in the subframe 8 of the frame n to the serving cell in response to the DL reception(s). In one example, the situation may happen, if the HARQ feedback is not transmitted in the subframe 7 of the frame n, e.g., a LBT indicates that the subframe 7 is not clear. Another HARQ feedback in response to one or more DL receptions performed in the subframes 3-4 of the frame n may also be transmitted jointly with the second HARQ feedback in the subframe 8 of the frame n to the serving cell. Similarly, according to the reference UL/DL configuration and the timing offset, the communication device transmits a HARQ feedback in the subframe 9 of the frame n in response to DL reception(s) in the subframes 3-4 of the frame n. Transmissions of HARQ feedbacks in other subframes can be illustrated according to the above description, and is not narrated herein.

Association indices of the reference UL/DL configuration are shown in FIG. 10, and operations related to the association indices are explained as follows. The association set of the subframe 6 of the reference UL/DL configuration (i.e., the subframe 7 of the communication device) includes the association set indices 6 and 5 and is used for determining HARQ resource, when the communication device intends to transmit a HARQ feedback in the subframe 7 of the communication device. The association set indices 6 and 5 correspond to DL receptions performed in the subframes 1-2 of the communication device, respectively. The association set of the subframe 7 of the reference UL/DL configuration (i.e., the subframe 8 of the communication device) includes the association set indices 5, 4, 7 and 6 and is used for determining HARQ resource, when the communication device intends to transmit a HARQ feedback in the subframe 8 of the communication device. The association set indices 5, 4, 7 and 6 correspond to DL receptions performed in the subframes 3, 4, 1 and 2 of the communication device, respectively. The association sets of other subframes can be illustrated according to the above description, and is not narrated herein.

It should be noted that a serving cell mentioned above may be a UL licensed serving cell, a DL licensed serving cell, a UL unlicensed serving cell and/or a DL unlicensed serving cell, but is not limited herein. In addition, the features and/or the operations of a communication device mentioned above may imply corresponding features and/or operations of the network, but is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides device and a method for handling a HARQ feedback for a serving cell. Reliability of a transmission of the HARQ feedback is improved. Uncertainty of available resource of the serving cell is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a hybrid automatic repeat request (HARQ) transmission, comprising:
    a storage unit, for storing instructions of:
        performing a first downlink (DL) reception in a first subframe from a serving cell of a network; and
        transmitting a first HARQ feedback in a second subframe to the serving cell in response to the first DL reception, wherein the second subframe is determined according to the first subframe and a sum of a predetermined timing and a first HARQ timing, wherein the first HARQ timing is for transmitting the first HARQ feedback of a packet received according to the first DL reception, and the first HARQ timing is indicated by a DL control information (DCI) transmitted by the network;
    wherein a uplink (UL) resource for transmitting the first HARQ feedback is selected from a plurality of UL resources of the second subframe, and each of the plurality of UL resources is scheduled with a starting point, a duration and a bandwidth;
    wherein the first HARQ timing indicates whether the first HARQ feedback is postponed and/or a time period postponed with respect to the predetermined timing; and
    a processing circuit, coupled to the storage unit, configured to execute the instructions stored in the storage unit.

2. The communication device of claim 1, wherein the predetermined timing is a fixed value stored in the communication device, or is configured by the serving cell.

3. The communication device of claim 1, wherein the sum of the predetermined timing and the first HARQ timing is determined according to a DCI for the first DL reception.

4. The communication device of claim 1, wherein the storage unit further stores the instruction of:
    performing a second DL reception in a third subframe from the serving cell; and
    transmitting a second HARQ feedback in a fourth subframe to the serving cell in response to the second DL reception, wherein the fourth subframe is determined according to the third subframe, and a sum of the predetermined timing and a second HARQ timing.

5. The communication device of claim 4, wherein the communication device transmits the first HARQ feedback and the second HARQ feedback according to a time-domain bundling, when the second subframe and the fourth subframe are the same subframe.

6. The communication device of claim 4, wherein the communication device transmits the first HARQ feedback and the second HARQ feedback according to the sum of the predetermined timing and the first HARQ timing and the sum of the predetermined timing and the second HARQ timing, when the second subframe and the fourth subframe are the same subframe.

7. The communication device of claim 4, wherein the communication device transmits the first HARQ feedback and the second HARQ feedback according to a first DCI for the first DL reception and a second DCI for the second DL reception, when the second subframe and the fourth subframe are the same subframe.

8. The communication device of claim 1, wherein the first HARQ feedback is transmitted via a dedicated resource, and the dedicated resource is determined according to a higher layer configuration, a shift for the second subframe and/or a number of control channel element (CCE) indices of a DCI corresponding to the first DL reception.

9. The communication device of claim 1, wherein the DCI is a common DCI.

* * * * *